Jan. 22, 1963  A. P. POLMON  3,074,292
KNOB AND SELF-LOCKING INSERT
Filed Sept. 14, 1960  2 Sheets-Sheet 1
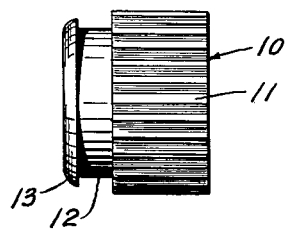
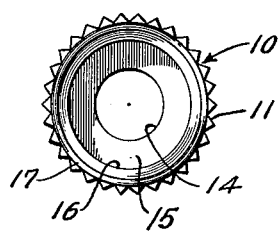
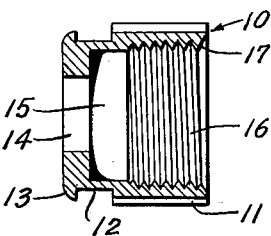
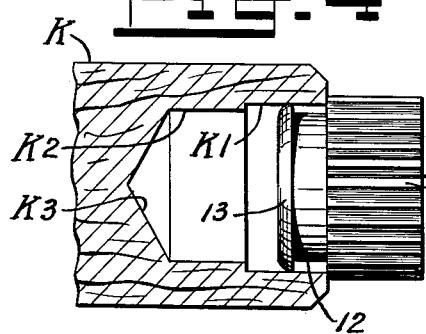
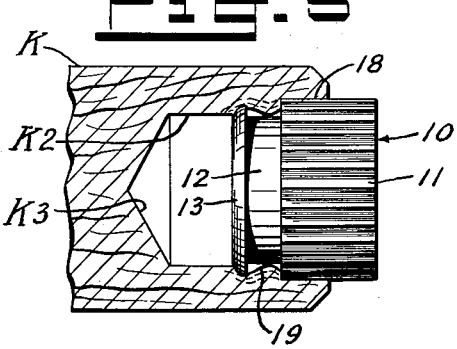
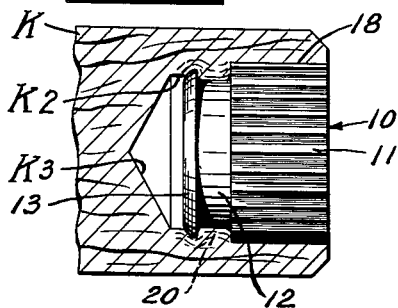
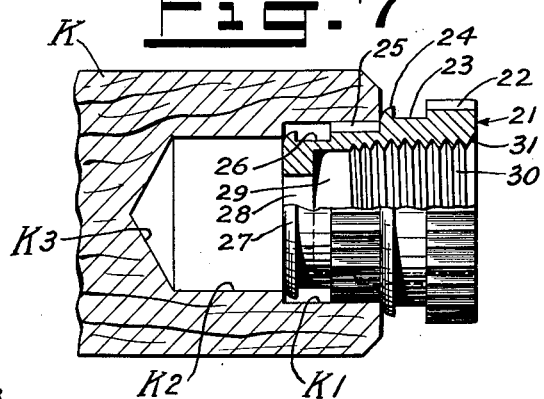
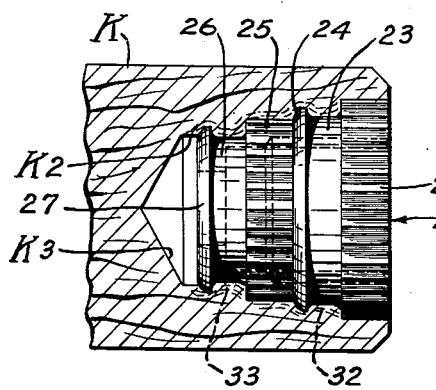
INVENTOR.
ANTHONY P. POLMON
BY
H. G. Manning
ATTORNEY Jan. 22, 1963 A. P. POLMON 3,074,292
KNOB AND SELF-LOCKING INSERT
Filed Sept. 14, 1960 2 Sheets-Sheet 2

INVENTOR.
ANTHONY P. POLMON
BY
H. G. Manning
ATTORNEY

United States Patent Office 3,074,292
Patented Jan. 22, 1963

3,074,292
KNOB AND SELF-LOCKING INSERT
Anthony P. Polmon, 130 Country Club Road,
Waterbury, Conn.
Filed Sept. 14, 1960, Ser. No. 56,011
1 Claim. (Cl. 74—553)

This invention relates to articles made from wood, fiberboard, Fiberglas, nylon, rubber, die castings, aluminum, or other resilient yieldable elastic materials for use on radio cabinets, refrigerators, clocks, clock cases, connector panels, cabinets of all sorts, furniture, drawers, handles, poles, electrical parts and switches, telephone components, etc.

One object of the invention is to provide a nonrestractable knob insert formed from metal or other rigid material having an internally threaded hollow section which is tapped for detachably receiving a screw projecting from the article on which the knob is to be used.

A further object is to provide a nonretractable insert of the above nature having a convex exterior lip which is adapted to be forced into the resilient elastic material causing the fibers thereof to expand outwardly beyond said lip and thereafter return inwardly and serve as a lock for holding the article securely in position.

A further object is to provide a tubular self-locking insert of the above nature, in which provision is made of longitudinal flutes which are forced within a cylindrical recess formed in the article to prevent it from twisting.

A further object is to provide a device of the above nature which will be simple in construction, easy to assemble, inexpensive to manufacture, easy to install and manipulate, compact, ornamental in appearance, and very efficient and durable in use.

With these and other objects in view, there have been illustrated on the accompanying drawings, three forms in which the invention may conveniently be embodied in practice.

In the drawings:

FIG. 1 illustrates a side view of the first form of metal insert.

FIG. 2 is an end view of the same.

FIG. 3 is a longitudinal cross-sectional view of the same.

FIG. 4 is a cross-sectional view of a knob of resilient yieldable elastic material as it appears with the insert partially assembled and showing the convex beveled lip fitting snugly within the outer step of the interior recess of the knob.

FIG. 5 is a similar cross-sectional view showing the insert in a further assembled position, with the beveled lip as it appears when the material of the knob has been spread outwardly without cutting, and also showing the fluted nibs on the outer portion of the insert partially embelled in the outer step of the knob.

FIG. 6 is a similar cross-sectional view showing the insert fully assembled in the knob, with the material which has been spread apart by the convex lip automatically retracted inwardly into the neck between said lip and the outer fluted section, and with the fluted section flush with the outer end of said knob.

FIG. 7 is a similar cross-sectional view of the knob, showing a modified second form of insert having a pair of beveled lips and a pair of fluted sections, as said insert appears when partially inserted within the outer step of the knob recess.

FIG. 8 is a similar cross-sectional view of the same showing the beveled lips and flutes fully assembled and embedded in both the outer and inner steps of the knob, and showing the outer fluted section flush with the outer section of said knob.

Figure 9:
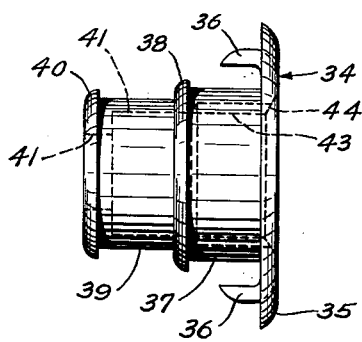
FIG. 9 represents a side view of a third form of insert having no flutes, but provided with two convex lips, and having an outer end flange provided with a pair of radial opposed lugs which are adapted to be bent inwardly and embedded in the ends of the knob to prevent twisting of said insert with respect to said knob.

Referring now to the drawings, in which like reference numerals denote corresponding parts throughout the several views, the letter K indicates a cylindrical knob formed of wood, nylon, rubber, Fiberglas, aluminum or other similar soft yieldable resilient elastic material, said knob having an interior outer step cylindrical recess K1, an inner cylindrical step K2 of somewhat smaller diameter than said outer recess K1, and a conical socket recess K3.

The numeral 10 indicates a substantially cylindrical insert of a metallic material such as aluminum, brass or steel and having an outer fluted section 11 which is adapted to lie flush with the end of the knob K when in assembled position. The insert 10 is provided with a reduced cylindrical intermediate neck 12 somewhat smaller in diameter than the step K1 and terminating in a convex inner circular lip 13 which adapted to fit snugly within said step K1 (FIG. 4). The lip 13 is provided with a cylindrical hole 14 which communicates with a socket 15 of somewhat larger diameter having a tapped outer portion 16 provided with threads which are adapted to fit over a screw projecting from an instrument such as a radio cabinet, refrigerator, etc.

The tapped section 16 is provided with an outer beveled end 17 to facilitate the entrance of the screw into the insert 10.

As clearly shown in FIG. 5, the numeral 19 indicates the appearance of the yieldable material of the knob K after it has been expanded by the partial insertion of the lip 13 into the inner step K2, and which has returned inwardly automatically into the neck 12 of the insert. The numeral 20, as shown in FIG. 6, indicates the appearance of said spread-apart material after it has fully returned automatically and embraces both sides of the lip 13.

Operation of the First Form

In the operation of the first form of the invention, the metal insert 10 will be pushed through the outer step K1 of the recess in the interior of the knob K, causing the fluted section 11 of said insert to become embedded in the outer step K1, as clearly shown in FIG. 6, so as to positively prevent rotation of the knob with respect to the screw during use. The convex end lip 13 will be embedded securely in the stepped section K2 of the knob, and will lock the insert 10 securely from being pulled outwardly, without the use of a set screw which was previously required in a knob of this type.

Second Form

In the second form of the invention, illustrated in FIGS. 7 and 8, an insert 21 is provided having an outer fluted section 22 and a reduced neck 23 between said fluted section 22 and a convex intermediate lip 24.

Provision is also made of an intermediate fluted section 25 adjoining the lip 24 and terminating at its inner end in a reduced neck 26, which in turn terminates in an inner convex lip 27. The interior of the insert 21 is provided with an inner hole 28 located within the lip 27, and which communicates with an interior socket 29, the outer portion 30 of which is tapped to receive the screw of the radio cabinet or other instrument upon which the knob K is to be mounted. The outer portion of the tapped section 30 is provided with a bevel 31.

As clearly shown in FIG. 8, the resilient material of the knob K which has been spread apart by the convex lips 24 and 27, will spring or flow backward automatically into the necks 23 and 26 as indicated by the numerals 32 and 33 to embrace said lips.

Third Form

Figure 10:
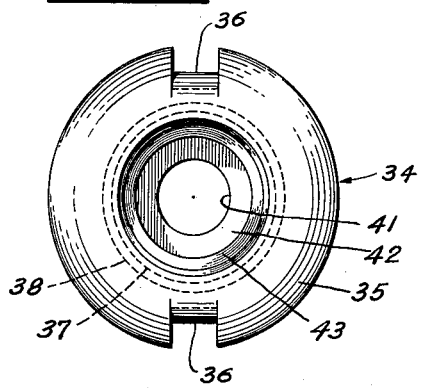
FIG. 10 is an end view of the same.
Figure 11:
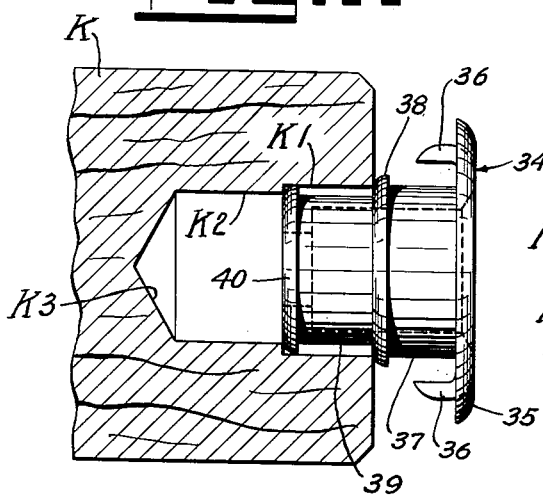
FIG. 11 is a cross-sectional view of the same, with the insert partially inserted in the knob recess.
Figure 12:
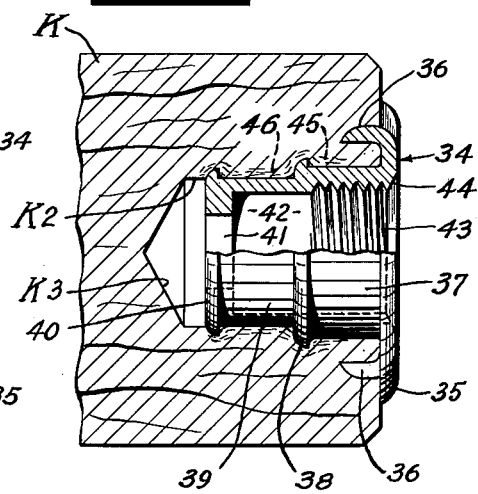
FIG. 12 is a similar cross-sectional view of the same, showing the two beveled lip inserts fully embedded within the stepped sections of the knob recess, with the lugs of the outer flange embedded in the end of the knob, and with said flange seated flat upon the end of said knob.

In the third form of the invention, shown in FIGS. 9 to 12, provision is made of an unfluted insert 34 having an outer flat end flange 35 of somewhat larger diameter than the body of the insert, said flange having a pair of opposed radial struck out lugs 36 which are bent inwardly from the plane of the flange 35. Provision is also made of an outer neck 37, a convex intermediate lip 38, an inner neck 39, and an inner convex lip 40, both of said lips being adapted to be forced into the material of the inner step K2 of the knob K, expanding said material outwardly, and allowing it to return automatically into the necks 37 and 39 as indicated by the numerals 45, 46, FIG. 12.

The numeral 41 indicates an inner hole formed within the lip 40 which communicates with an inner socket 42, having a tapper outer end 43, the extremity of which is beveled at 44. In this form of the invention the convex lips 38 and 40 serve the function of preventing the retraction of the insert from the knob. The inwardly-bent lugs 36 also impact the material of the knob against the neck 37 and assist in preventing twisting of said insert with respect to the knob.

While there have been disclosed in this specification three forms in which the invention may be embodied, it is to be understood that these forms are shown for the purpose of illustration only and that the invention is not limited to these specific disclosures but may be modified and embodied in various other equivalent forms without departing from its spirit. In short, the invention includes all the modifications and embodiments coming within the scope of the following claim.

Having thus fully described the invention, what is claimed as new and for which it is desired to secure Letters Patent is:

In a combination device for attachment to a screw, an article of soft yieldable elastic resilient material having a pair of cylindrical adjacent interior stepped recesses of different diameters, the inner step being of smaller diameter than the outer step, and a rigid substantially cylindrical tapped insert having a reduced neck and an end convex lip of the same diameter as said outer recess for receiving said screw, whereby when said insert is forced longitudinally into said smaller step beyond the shoulder between said steps, said material will be expanded and will thereafter return automatically into the neck of said insert at the outer side of said lip, and prevent said insert from pulling out of said article, the outer end of said insert being provided with a fluted section slightly larger in diameter than said outer step, whereby when said insert is forced into said outer step, the fluted section thereon will broach the soft yieldable material of said article and prevent twisting of said insert with respect to said article during use.

References Cited in the file of this patent

UNITED STATES PATENTS

| | | |
|---|---|---|
| 1,444,212 | Seiss | Feb. 6, 1923 |
| 1,919,455 | Wilson | July 25, 1933 |
| 2,358,728 | Miller | Sept. 19, 1944 |
| 2,607,446 | Rosan | Aug. 19, 1952 |
| 2,685,320 | Rosan | Aug. 3, 1954 |
| 2,722,259 | Eckenbeck et al. | Nov. 1, 1955 |

FOREIGN PATENTS

| | | |
|---|---|---|
| 1,178,030 | France | Dec. 8, 1958 |